US011354600B2

United States Patent
Nguyen et al.

(10) Patent No.: US 11,354,600 B2
(45) Date of Patent: Jun. 7, 2022

(54) SYSTEM AND METHOD FOR HETEROGENEOUS RELATIONAL KERNEL LEARNING

(71) Applicant: Booz Allen Hamilton Inc., McLean, VA (US)

(72) Inventors: Andre Tai Nguyen, Seattle, WA (US); Edward Raff, Columbia, MD (US)

(73) Assignee: BOOZ ALLEN HAMILTON INC., McLean, VA (US)

(*) Notice: Subject to any disclaimer, the term of this patent is extended or adjusted under 35 U.S.C. 154(b) by 122 days.

(21) Appl. No.: 16/536,926

(22) Filed: Aug. 9, 2019

(65) Prior Publication Data

US 2020/0286001 A1    Sep. 10, 2020

Related U.S. Application Data

(60) Provisional application No. 62/814,059, filed on Mar. 5, 2019.

(51) Int. Cl.
  *G06N 20/10*    (2019.01)
  *G06N 20/20*    (2019.01)
  *G06N 7/00*    (2006.01)

(52) U.S. Cl.
  CPC ............. *G06N 20/10* (2019.01); *G06N 7/005* (2013.01); *G06N 20/20* (2019.01)

(58) Field of Classification Search
  CPC ......... G06N 20/10; G06N 20/20; G06N 7/005
  See application file for complete search history.

(56) References Cited

U.S. PATENT DOCUMENTS 10,148,680 B1* 12/2018 Segev ................... H04L 63/145
2017/0039198 A1* 2/2017 Ramamurthy .......... G06F 16/93
2018/0054085 A1* 2/2018 Yan ....................... G06K 9/6244

OTHER PUBLICATIONS

Hwang et al., "Automatic Construction of Nonparametric Relational Regression Models for Multiple Time Series", 2016, pp. 1-9. (Year: 2016).*
Tao et al., "Bayesian Tensor Approach for 3-D Face Modeling", 2008, IEEE, pp. 1397-1409. (Year: 2008).*
Xie, Lexing, et al. "Learning hierarchical hidden Markov models for video structure discovery." ADVENT Group, Columbia Univ., New York, Tech. Rep 6 (2002). (Year: 2002).*

(Continued)

*Primary Examiner* — Li B. Zhen
*Assistant Examiner* — Henry Nguyen
(74) *Attorney, Agent, or Firm* — Buchanan Ingersoll & Rooney PC (57) ABSTRACT

A computer-implemented method for generating an interpretable kernel embedding for heterogeneous data. The method can include identifying a set of base kernels in the heterogeneous data; and creating multiple sets of transformed kernels by applying a unique composition rule or a unique combination of multiple composition rules to the set of base kernels. The method can include fitting the multiple sets into a stochastic process model to generate fitting scores that respectively indicate a degree of the fitting for each of the multiple sets; storing the fitting scores in a matrix; and standardizing the matrix to generate the interpretable kernel embedding for the heterogeneous data.

14 Claims, 12 Drawing Sheets

(56) References Cited

OTHER PUBLICATIONS

R. Campello, et al., "Density-Based Clustering Based on Hierarchical Density Estimates", Advances in Knowledge Discovery and Data Mining, PAKDD, 2013, Part II, pp. 160-172.

Duvenaud, et al., "Structure Discovery in Nonparametric Regression through Compositional Kernel Search", Proceedings of the 30th International Conference on Machine Learning, PMLR 28(3), 2013, pp. 1166-1174.

Lin, et al., "Finding structural similarity in time series data using bag-of-patterns representation", Proceeding SSDBM 2009 Proceedings of the 21st International Conference on Scientific and Statistical Database Management, 2009, pp. 467-477.

Lloyd, et al., "Automatic Construction and Natural-Language Description of Nonparametric Regression Models", Proceedings of the Twenty-Eighth AAAI Conference on Artificial Intelligence, 2014, pp. 1242-1250.

Paparrizos, et al., "Fast and Accurate Time-Series Clustering", ACM Transactions on Database Systems, vol. 42, No. 2, Article 8, Jun. 2017, 49 pages.

Rasmussen, et al., "Gaussian Processes for Machine Learning," University Press Group Limited, 2006.

Rosenberg, et al., "V-Measure: A conditional entropy-based external cluster evaluation measure", Proceedings of the 2007 Joint Conference on Empirical Methods in Natural Language Processing & Computational Natural Language Learning, Jun. 2007, pp. 410-420.

Salvador, et al., "Toward Accurate Dynamic Time Warping in Linear Time and Space", Time, 11(5), 2004, pp. 70-80.

Schwarz, "Estimating the Dimension of a Model", The Annals of Statistics, vol. 6, No. 2, Mar. 1978, pp. 461-464.

Wilson, et al., "Gaussian Process Kernels for Pattern Discovery and Extrapolation", Journal of Machine Learning Research 28, No. 3, 2013, pp. 1067-1075.

Yunseong, et al., "Automatic Construction of Non Parametric Relational Regression Models for Multiple Time Series," ICML'16 Proceedings of the 33rd International Conference on International Conference on Machine Learning—vol. 48, 2016, pp. 3030-3039.

\* cited by examiner

SYSTEM AND METHOD FOR HETEROGENEOUS RELATIONAL KERNEL LEARNING

FIELD

The present disclosure provides methods and systems for heterogeneous relational kernel learning.

BACKGROUND INFORMATION

Determining hidden pockets of order can be difficult in large datasets. Known machine learning methods that attempt to model all or most of the data in the presence of outliers fail to accurately identify and model an order present in the data. Modeling the majority of the data can be inappropriate for hypothesis generation as it overlooks order in small subsets of the data. This can create challenges for automatic hypothesis generation especially from large, noisy datasets.

As provided in "Automatic Construction of Non Parametric Relational Regression Models for Multiple Time Series," 2016 by Yunseong et al., incorporated herein by reference, although Automatic Bayesian Covariance Discovery (ABCD) searches can be used over a space of regression models to learn the individual kernel components, doing so is not feasible due to the explosion of the search space. To avoid complexity issues, the individual kernel components are represented using the spectral mixture kernel. This is described in "Gaussian Process Kernels for Pattern Discovery and Extrapolation," 2013, by Wilson et al., incorporated herein by reference. While this allows Semi-Relational Kernel Learning (SRKL) to model multiple time series that may have some structural differences, the single shared kernel component makes it still necessary that the multiple time series be somewhat homogeneous in nature. This can be problematic when outliers exist in the data or when the data is heterogeneous.

Compositional kernel search builds its explanation of the data starting from simple, interpretable concepts (periodicity, linearity, noise, variance, change, etc.) and combining these concepts iteratively to better model the data. The compositional nature of the approach allows for the automatic description of the discovered data characteristics in human-friendly natural language. For example, the product of squared exponential and periodic kernels can be interpreted as "locally periodic" structure, and the addition of squared exponential and periodic kernels can be interpreted as "periodic with noise."

However, computational intractability remains one among many technical challenges to extending the known techniques to find structure in subsets of multiple time series as searching through all the possible structure-sharing combinations would result in an explosion in complexity. Aspects of the present disclosure present technical solutions to address these technical challenges.

SUMMARY

A computer-implemented method for generating an interpretable kernel embedding for heterogeneous data is disclosed. The method can include identifying a set of base kernels in the heterogeneous data; creating multiple sets of transformed kernels by applying a unique composition rule or a unique combination of multiple composition rules to the set of base kernels; fitting the multiple sets into a stochastic process model to generate fitting scores that respectively indicate a degree of the fitting for each of the multiple sets; storing the fitting scores in a matrix; and standardizing the matrix to generate the interpretable kernel embedding for the heterogeneous data.

A system for generating an interpretable kernel embedding for heterogeneous data is disclosed. The system can include an identification module configured to identify a set of base kernels in heterogeneous data; a transformation module configured to create multiple sets of transformed kernels by an application of a unique composition rule or a unique combination of multiple composition rules to the set of base kernels; a scoring module configured to fit the multiple sets into a stochastic process model, and generate fitting scores that respectively indicate a degree of the fitting for each of the multiple sets; and a normalization module configured to save the fitting scores in a matrix and standardize the matrix to generate an interpretable kernel embedding for heterogeneous data.

BRIEF DESCRIPTION OF THE DRAWINGS

Other objects and advantages of the present disclosure will become apparent to those skilled in the art upon reading the following detailed description of exemplary embodiments, in conjunction with the accompanying drawings, in which like reference numerals have been used to designate like elements, and in which.

DETAILED DESCRIPTION

The present disclosure describes techniques (methods and systems) to discover interpretable structure in subsets of time series data using an interpretable kernel embedding for time series. These techniques are simple to implement, computationally feasible, and can readily be incorporated into Relational Kernel Learning (RKL) and Semi-Relational Kernel Learning (SRKL) with little additional computation, enabled by the reuse of intermediary computational outputs from RKL. Applications of the disclosed techniques can include, but are not limited to, clustering, pattern discovery, and anomaly detection based on the structural similarities and differences among time series in a dataset.

The present disclosure extends known techniques to create interpretable kernel embeddings for time series which allow for wider flexibility to deal with noisy data that may contain outliers and for the inclusion of sub-population identification as a natural part of an automated statistician. In other words, this embedding allows for heterogeneous relational kernel learning and for automatic hypothesis generation from sets of time series where only subsets of the time series share structure. More broadly, this embedding can also be used for tasks such as clustering, pattern discovery, and anomaly detection in sets of time series.

Figure 1:
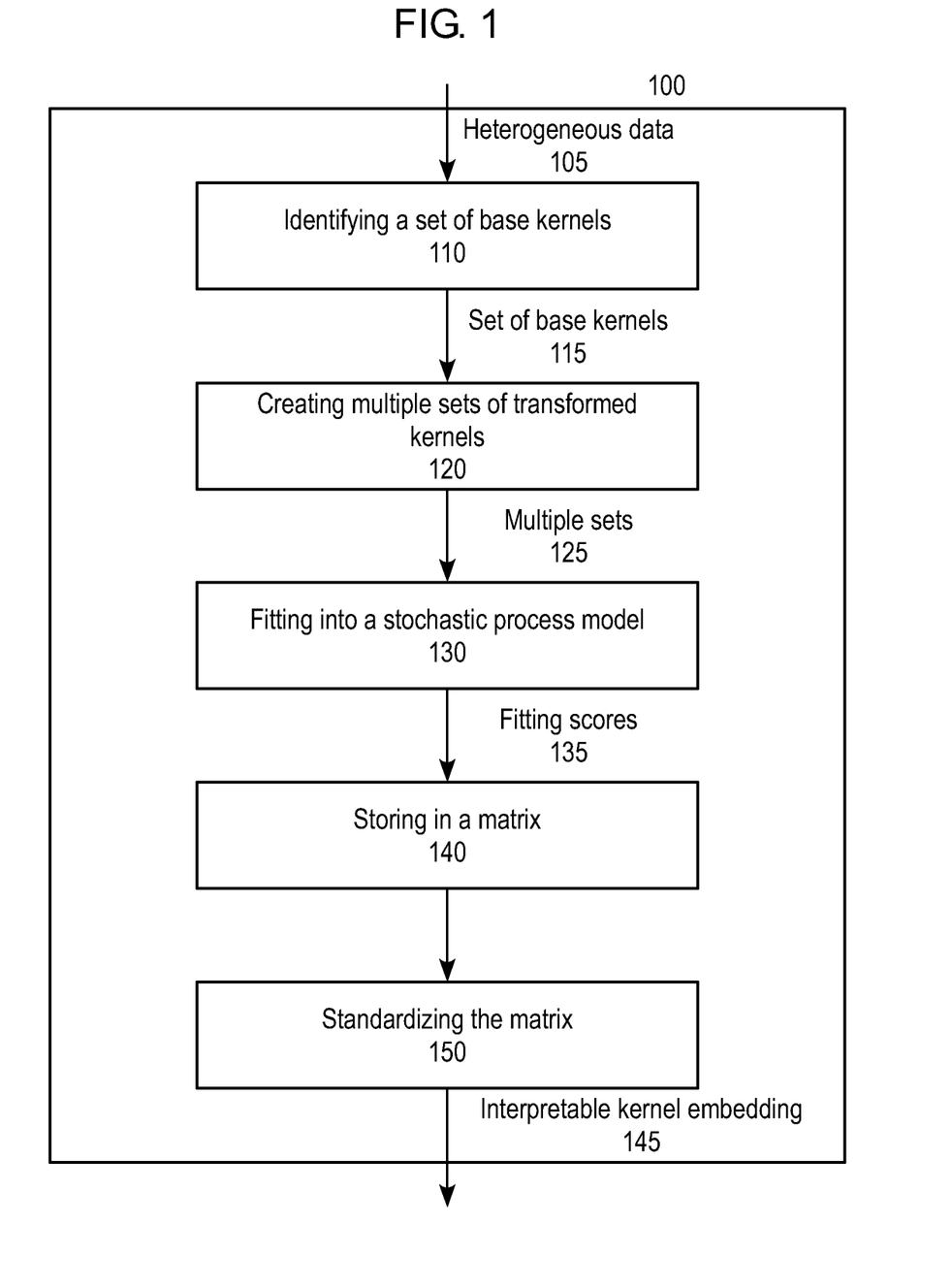
FIG. 1 shows an exemplary flowchart of method for generating an interpretable kernel embedding for heterogeneous data.

FIG. 1 illustrates a flowchart for a method 100 for generating an interpretable kernel embedding for heterogeneous data 105, which can include a variety of dissimilar types of data. For example, a heterogeneous data structure can include various data of different data types like integer, float and character. The examples of such data structures include classes, structures, union, etc.

In an exemplary embodiment, the method 100 can include a step 110 of identifying a set of base kernels 115 in the heterogeneous data 105. Each base kernel in the set of base kernels 115 can define one or more functional properties of the heterogeneous data 105. The set of base kernels 115 can include a kernel that explains a member of a subset of time series which is structurally similar to the entire subset.

In an exemplary embodiment, the method 100 can include a step 120 of creating multiple sets of transformed kernels 125 by applying a unique composition rule or a unique combination of multiple composition rules to the set of base kernels 115. Each set of transformed kernels can be created by applying a different (unique) composition rule to the set of base kernels 115. Alternately, each set of transformed kernels can be created by applying unique combination of multiple composition rules to the set of base kernels 115.

Exemplary ways of performing the steps 110 and 120 are described in "Structure Discovery in Nonparametric Regression through Compositional Kernel Search," 2013, by Duvenaud et al., which is incorporated herein by reference. Duvenaud et al. defines a language of regression models by specifying a set of base kernels capturing different function properties and a set of composition rules that combine kernels to produce other valid kernels.

In an exemplary embodiment, the method 100 can include a step 130 of fitting the multiple sets 125 into a stochastic process model to generate fitting scores 135 that respectively indicate a degree of fitting for each of the multiple sets 125. To fit a time series, a greedy search can be performed over the space of regression models, where each kernel-specified model's parameters are optimized by conjugate gradient descent and where optimized models can be compared using the Bayesian Information Criterion (BIC): BIC(M)=−2 log p(D|M)+|M| log n, where M is an optimized model, |M| is the number of kernel parameters, p(D|M) is the marginal likelihood of the data D, and n is the number of data points.

In an exemplary embodiment, BIC can be chosen as the criterion for evaluating kernels because it balances model fit and model complexity while avoiding an intractable integral over kernel parameters. This is described in detail in "Advances in Neural Information Processing Systems," 2001, by Carl Edward Rasmussen et al.; and "Estimating the Dimension of a Model," 1978, by Schwarz. Both of these are incorporated by reference in their entirety.

In an exemplary embodiment, a Gaussian process (GP) can be the stochastic process model of the step 130. GP can be a generalization of the Gaussian probability distribution to functions. Specifically, a GP can be a collection of random variables, any finite number of which have a joint Gaussian distribution. A GP can be completely specified by its mean function and covariance function: $f(x) \sim GP(m(x), k(x, x'))$, where $m(x)=E[f(x)]$. This is described in detail in "Gaussian Processes for Machine Learning," 2006, by C E Rasmussen, et al., which is incorporated herein by reference.

In an exemplary embodiment, a zero mean function can be used as marginalizing feature over an unknown mean function, the zero mean function can be expressed using a zero mean GP with a modified kernel. The structure of the kernel function can determine how the Gaussian process model generalizes the data.

Techniques described in Duvenaud et al. and "Automatic Construction and Natural-Language Description of Nonparametric Regression Models," 2014, by Lloyd et al. which is incorporated by reference, introduce a method for the automatic statistical analysis of time series using compositional Gaussian process kernel search. A time series is modeled by a Gaussian process model and the goal is to find a descriptive and expressive kernel. This approach is capable of automatically discovering underlying structure in a time series such as change points, trends, local and global behaviors, periodicities, and variations at multiple resolutions.

In an exemplary embodiment, natural language descriptions of time series can be automatically generated via an Automatic Bayesian Covariance Discovery (ABCD) algorithm which uses the language of regression models from Duvenaud et al. This ABCD algorithm is described in detail in Lloyd et al.

Further, Yunseong et al. describes two kernel learning methods that can extend ABCD to model shared covariance structures across multiple time series. Relational Kernel Learning (RKL) can find a model that explains multiple time series $D=d_1, d_2, \ldots d_J$ to a user-desired or user-detailed level of acceptability. Assuming conditional independence of the marginal likelihoods of each time series allows for the simple computation of the marginal likelihood of the entire dataset:

$$p(D \mid M) = p(d_1, d_2, \ldots, d_J \mid M) = \prod_{j=1}^{J} p(d_j \mid M)$$

The presence of exactly identical structures across all the time series in a dataset is rare. To accommodate for variation in individual time series within a dataset, Semi-Relational Kernel Learning (SRKL) relaxes the exactly identical structure constraint of RKL by learning a set of kernels, one for each time series in a dataset. The kernels share a common component that captures structure found across the dataset while retaining individual components. In particular, the set of kernels learned by SRKL can be written as: $K_j=K_S+K_{dj}|d_j \in D$, j=1, 2, . . . , J, where $K_S$ is the shared kernel component and the $K_{dj}$ are the individual kernel components.

In an exemplary embodiment, the method 100 can include a step 140 of storing the fitting scores 135 in a matrix. Instead of using BIC values for determining only the best model, the BIC value for every kernel-series combination evaluated during the RKL search process can be saved via step 140. For example, after an iteration of searching over K kernels to fit J time series, a J by K BIC history matrix B can be defined where the matrix element $B_{jk}$ corresponds to the BIC of a Gaussian process model specified by kernel k, optimized for time series $d_j$.

In an exemplary embodiment, the method 100 can include a step 150 of standardizing the matrix to generate the interpretable kernel embedding 145 for the heterogeneous data. Each row of the BIC history matrix (e.g., matrix B shown in FIG. 2) can be standardized by removing the mean and scaling to unit variance. This standardized matrix can be used as the time series embedding. Each row of the BIC history matrix corresponds to the representation of a time series in the embedded space, and each column is a dimension of the embedded space and is associated with a specific kernel. Each dimension of the embedding can be interpretable because if the language of regression models from Duvenaud et al. is used, then each dimension of the embedding corresponds to an interpretable kernel composed of interpretable base kernels.

Exemplary embodiments of the present disclosure will be described according to experiments designed to explore properties and behavior of interpretable kernel embedding as described herein. The present disclosure describes three experiments: 1) Clustering; 2) Pattern discovery; and 3) Anomaly detection described in detail herein.

Clustering

Figure 3:
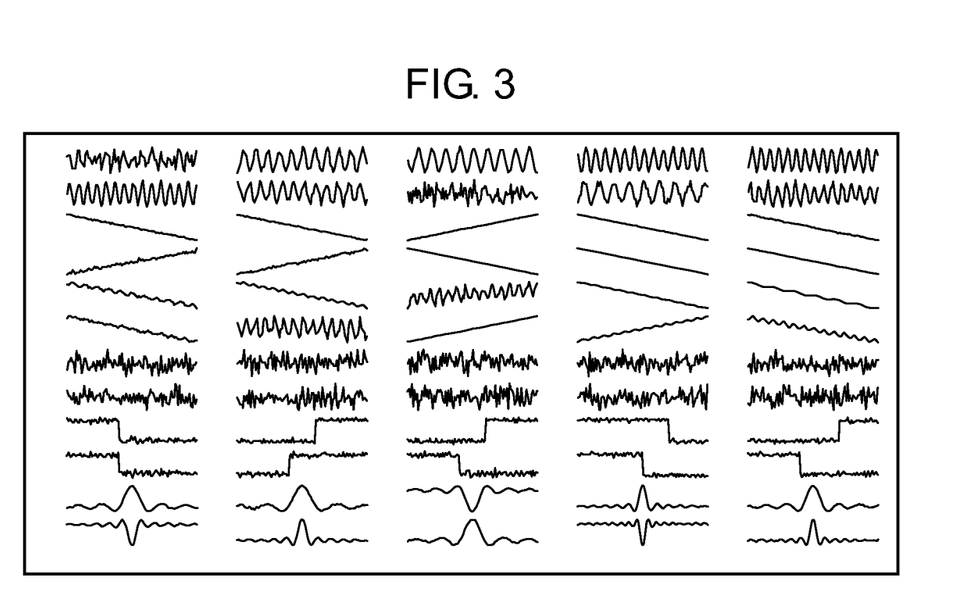
FIG. 3 shows an exemplary synthetic dataset consisting of 60 time series.

FIG. 3 illustrates a synthetic dataset of heterogeneous data, which consists of 60 standardized time series. The first 10 series are sine waves with varying amplitudes, frequencies, phases, and noise levels. The next 10 are lines with varying slopes, intercepts, and noise levels. The next 10 are sine waves with linear trends. The next 10 are random noise. The next 10 are variations on the Heaviside step function. The last 10 time series are variations on the sine function. Each set of 10 time series can be considered to form a class. The composition of a class shows that plural time series can be considered to be similar if they share structural elements. This can be true even if the elements differ in parameter values. The aforementioned six classes can be used as ground truth labels in the evaluation of a clustering task, which can be performed via the method 100, as described herein.

Figure 2:
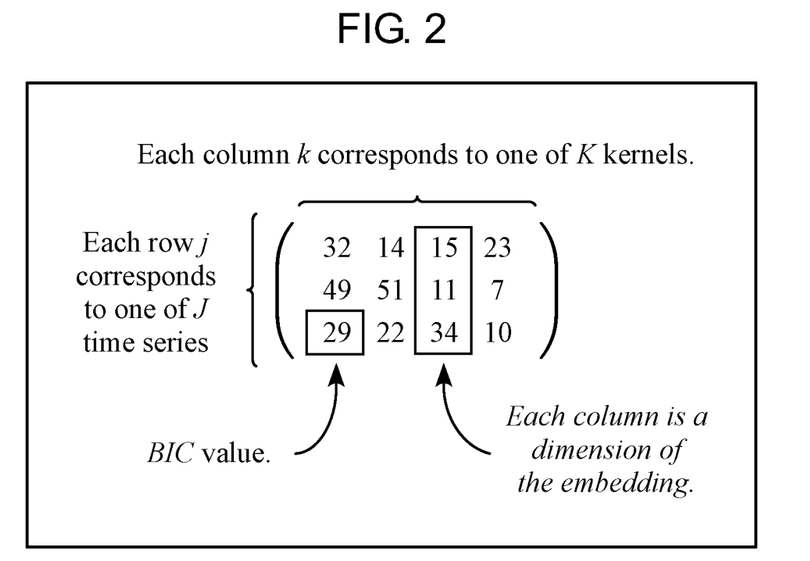
FIG. 2 illustrates an exemplary matrix for interpretable time series embedding.

To perform the clustering task, pairwise distances can be computed between the rows of the BIC history matrix B shown in FIG. 2 using cosine distance to obtain a J by J distance matrix P, which can then be used to uncover clusters of time series. Cosine distance is used because vector orientation is more important than vector magnitude when trying to capture the intuition that if a subset of time series is structurally similar, they should be described satisfactorily by a common subset of kernels and poorly described by another common subset of kernels.

Multiple approaches can be used for clustering. For example, HDBSCAN, a density-based, hierarchical clustering algorithm which improves upon DBSCAN, can be used because of its high cluster stability and because it does not require the specification of the number of clusters beforehand. This is described in "Density-Based Clustering Based on Hierarchical Density Estimates," 2013, by Campello et al., incorporated herein by reference.

For the clustering, base kernels can be used as the squared exponential kernel, the linear kernel, and the periodic kernel. A list of 87 kernels to evaluate can be generated by taking all non-redundant kernel structures of the following forms where $k_a$, $k_b$, and $k_c$ are base kernels: structures of the following forms where $k_a$, $k_b$, and $k_c$ are base kernels: $k_a$, $k_a*k_b$, $k_a+k_b$, $(k_a*k_b)*k_c$, $(k_a+k_b)*k_c$, $(k_a*k_b)+k_c$, and $(k_a+k_b)+k_c$.

Three baseline approaches can be evaluated to highlight the differences between the interpretable kernel embedding of the present disclosure and most known approaches. The first approach can be Dynamic Time Warping (DTW), which is a known approach that measures similarity between time series by non-linearly warping the series in the time dimension. The DTW approach is described in detail in "Toward Accurate Dynamic Time Warping in Linear Time and Space," 2004, by Salvador et al, which is incorporated by reference. The method 100 can use Euclidean distance DTW with HDBSCAN for the clustering task.

The second approach can be Symbolic Aggregate approximation Bag-of-Patterns (SAX BoP), which is a histogram-based representation for time series data that is essentially a bag-of-words model of the quantized time series. The SAX BoP representation can be used to compute a pairwise distance matrix followed by clustering. The method 100 can use for the clustering task, SAX BoP configured with hyperparameter settings, as described in "Finding structural similarity in time series data using bag-of-patterns representation," 2009, by Lin et al., in combination with Euclidean distance and HDBSCAN.

The third approach can be a k-Shape algorithm, which is a stronger baseline as a time series clustering algorithm that is invariant to scaling and shifting. This is described in "Fast and Accurate Time-Series Clustering," 2017, by Paparrizos et al., incorporated herein by reference. k-Shape can be centroid-based with a distance measure based on the cross-correlation measure. The k-Shape algorithm can require that the number of clusters be specified beforehand, a requirement that is not shared by the method 100 nor by other baselines.

Homogeneity, completeness, and V-measure can be used as cluster evaluation metrics when the labels for classifying the data are known. This is described in "V-Measure: A conditional entropy-based external cluster evaluation measure," 2007, by Rosenberg et al., incorporated herein by reference. The homogeneity score can capture how well the clustering reflects the desired property of each member of a cluster being of the same class. The completeness score captures how well the clustering reflects the desired property that all members of a given class are assigned to the same cluster. The V-measure is the harmonic mean of the homogeneity and completeness scores.

Table 1 below summarizes the homogeneity, completeness, and V-measure metrics of the clustering of the data described in FIG. 3 using interpretable kernel embedding with HDBSCAN (method 100), DTW with HDBSCAN, SAX BoP with HDBSCAN, and k-Shape. Homogeneity, completeness, and V-measure are all bounded below by 0 and above by 1, where 1 corresponds to a perfect clustering.

|  | Homogeneity | Completeness | V-Measure |
| --- | --- | --- | --- |
| IKE | 0.820 | 0.852 | 0.836 |
| DTW | 0.496 | 0.627 | 0.553 |
| SAX BoP | 0.363 | 0.684 | 0.475 |
| k-Shape | 0.490 | 0.526 | 0.507 |

The method 100 can also be performed with the third, sine waves with linear trends, class. The majority of the members of this class were clustered with members of the lines class, followed by members of this class being labeled as outliers or clustered with the sine wave class. In contrast, the DTW, SAX BoP, and k-Shape baselines all fail to distinguish sine waves from random noise, consistently clustering members of the sine wave and random noise classes together.

The results shown in Table 1 confirm that method 100 provides a unique and novel approach in classifying plural time series to be similar if the plural time series share structural elements. The method 100 also improves upon RKL and SRKL in the presence of heterogeneous time series data. When run on the data, both RKL and SRKL select the kernel PER*SE+LIN as encoding the following additive components: a linear function and a periodic function whose shape changes smoothly. This is described in detail in Lloyd et al.

In an exemplary embodiment, when RKL is individually performed on the sub-populations found by HDBSCAN using the method 100, the following kernels and descriptions can be selected. For the sub-population containing mostly sine waves, the kernel PER*PER+SE*PER can be selected, encoding the additive components: 'a periodic function modulated by a periodic function' and 'a periodic function whose shape changes smoothly.' The periodic nature of sine waves is well captured by the selected kernel. For the sub-population containing random noise and one sine wave with high noise, the same kernel, PER*PER+SE*PER, can be selected. For the sub-population containing mostly lines as well as sine waves with linear trends, the kernel LIN+PER*SE can be selected, encoding the additive components: 'a linear function' and 'a periodic function whose shape changes smoothly.' The characteristics of the subpopulation, linear trends sometimes with a periodic trend, are well captured by the selected kernel. For the sub-population containing step functions, the kernel SE+PER*SE can be selected, encoding the additive components: 'a smooth function' and 'a periodic function whose shape changes smoothly.' Finally, the sub-population containing sinc function is described by the PER+SE kernel which encodes the additive components: 'a periodic function' and 'a smooth function.'

The method 100 described herein leads to a more precise and useful automatic description of heterogeneous time series data over known approaches because it allows for the uncovering and characterization of sub-populations.

Pattern Discovery

In an exemplary embodiment the method 100 can be used on a pattern discovery task as described in detail by the following experiment. A set of nine search volume time series from Google Trends is used for the following terms: summer, winter, spring, fall, Zika, Rubio, python, coffee, and finance. The search volumes represent relative weekly search popularity in the United States between fixed dates.

Figure 4:
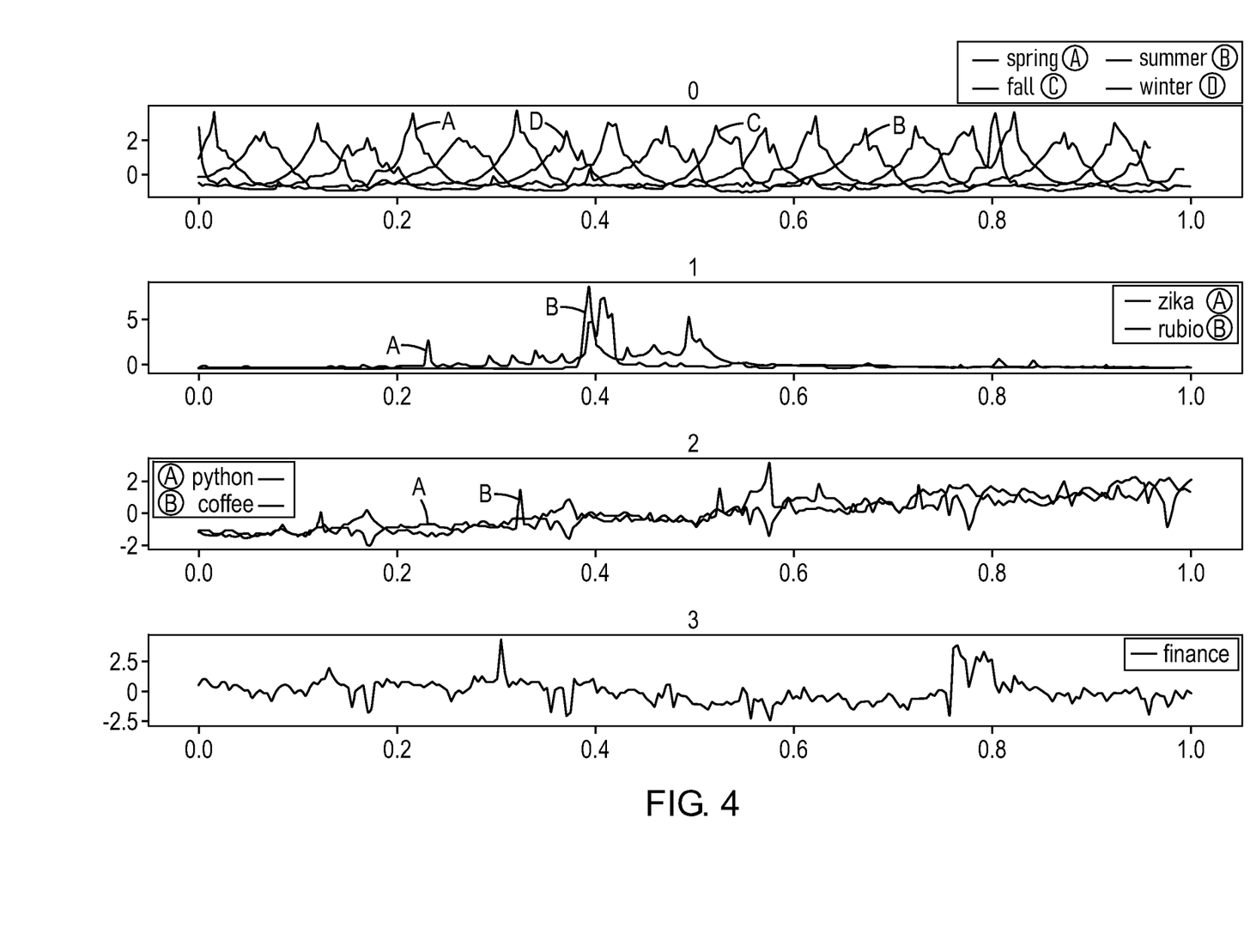
FIG. 4 illustrates an exemplary standardized search volume time series.

FIG. 4 illustrates the standardized search volumes time series from Google Trends. The data can be divided into four structural subsets. The search terms representing seasons can have a periodic structure. For example, the terms "Zika" and "Rubio" are overall flat with temporary surges in interest, "python" and "coffee" have linearly increasing trends, and "finance" has a flat structure with a couple of small surges in interest.

For the pattern discovery task, the method 100 can use the same configurations for kernels and baselines previously described for the clustering task. As multiple plausible groupings of the data exist and to elucidate what the different approaches consider as similar, the method 100 can utilize a hierarchical agglomerative clustering (HAC) algorithm.

In an exemplary embodiment, HAC algorithm can build a binary tree over the data by first assigning each datum to its own cluster and then merging groups together. The HAC algorithm can maintain an active set of clusters and at each stage determine which two clusters to merge, the union of the clusters can be added to the active set, and they can each be removed from the active set. A tree can be constructed by keeping track of which clusters are merged together at each step. To determine which clusters to merge, the HAC algorithm can choose the pair of clusters in the active set that have the smallest dissimilarity or distance. For example, for the distance metric a single linkage criterion which looks at the euclidean distance between the nearest members of the clusters can be chosen. A dendrogram can then be used to visualize the computed clustering.

Figure 5:
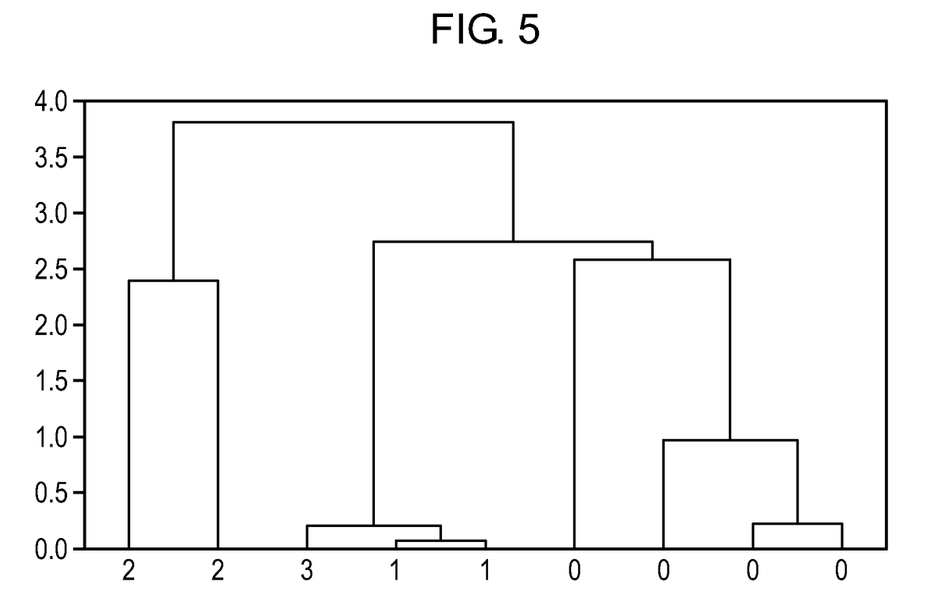
FIG. 5 shows a dendrogram visualizing an exemplary HAC clustering.

FIG. 5 illustrates the clustering results from the method 100, where leaf labels correspond to the grouping labels from FIG. 4. As illustrated in FIG. 5, the method 100 embedding leads to a clustering structure that immediately groups "Zika" and "Rubio," the time series with spikes in search volumes but overall flat structures. These two time series are then grouped with "finance," a time series with an overall flat structure and a number of relatively less significant spikes. The seasons "fall," "winter," "spring," and "summer" are grouped together, and the series with linear trends "python" and "coffee" are also grouped together. Overall on this dataset, the use of our interpretable kernel embedding results in logical groupings of the time series that would allow for heterogeneous relational kernel learning without resulting in an explosion of the search space.

Figure 6:
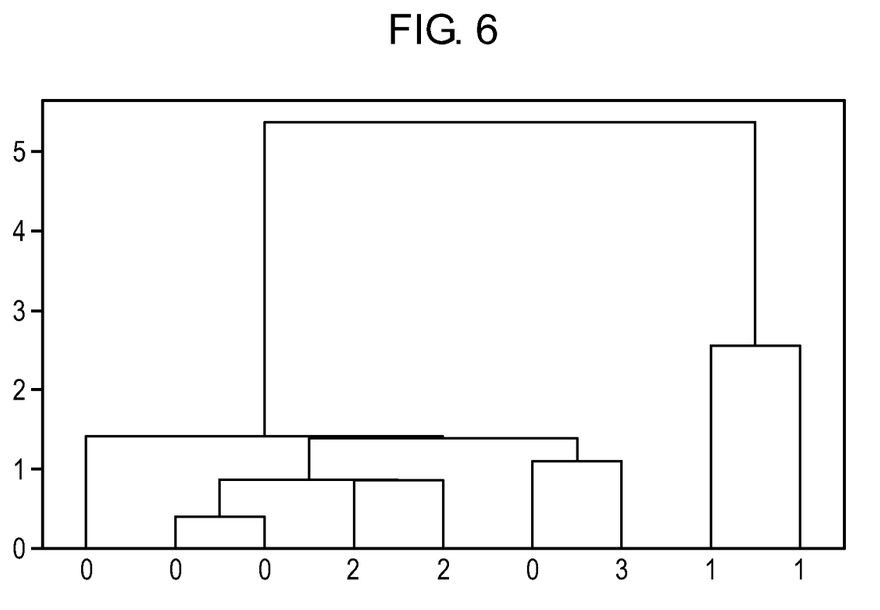
FIG. 6 shows a dendrogram visualizing an exemplary HAC clustering.

FIG. 6 shows the clustering found using SAX BoP. It can be seen that SAX BoP is not effective at finding the structure in the rest of the data, for example not being able to uncover the shared periodic structure in the seasonal data.

Figure 7:
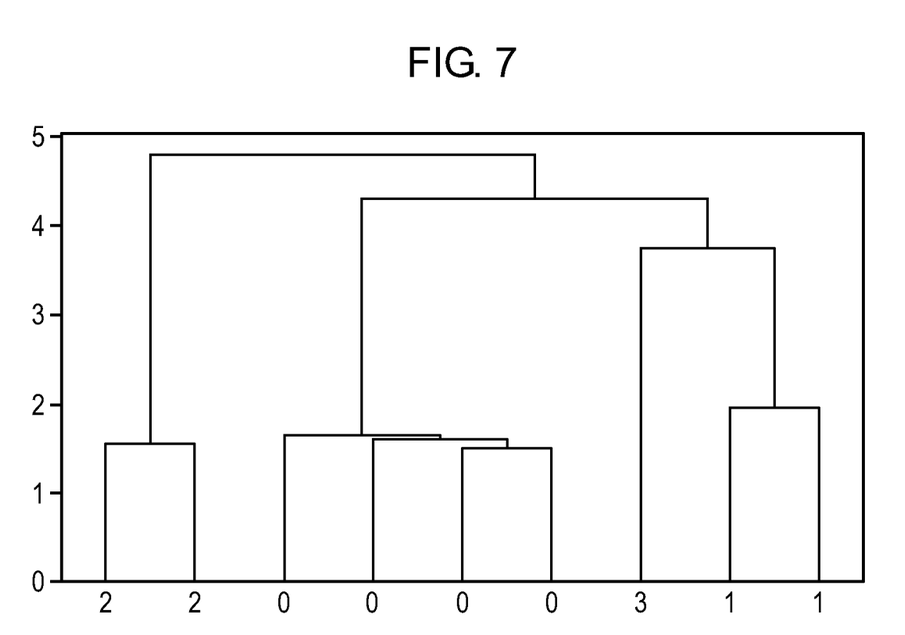
FIG. 7 shows a dendrogram visualizing an exemplary HAC clustering.

FIG. 7 shows the clustering found using DTW. As a centroid-based algorithm, k-Shape is not amenable to a dendrogram representation and specifies that the number of clusters be determined and identified beforehand. When initialized with the number of clusters set to four, k-Shape recovers the same groupings as shown in FIG. 4.

Anomaly Detection

In an exemplary embodiment, the method 100 can be used for anomaly detection. The heterogeneous data 105 in this case can include a PhysioNet Gait in Aging and Disease dataset which consists of walking stride interval (the time between successive heel strikes of the same foot) time series for 15 subjects: 5 healthy young adults, 5 healthy old adults, and 5 older adults with Parkinson's disease. One time series can be randomly selected from each class for corruption, where corruption consists of a zeroing out of sections of the series. This simulates the effect of real world errors that often occur during the reading, processing, transmission, writing, and storage of sensor data.

Figure 8:
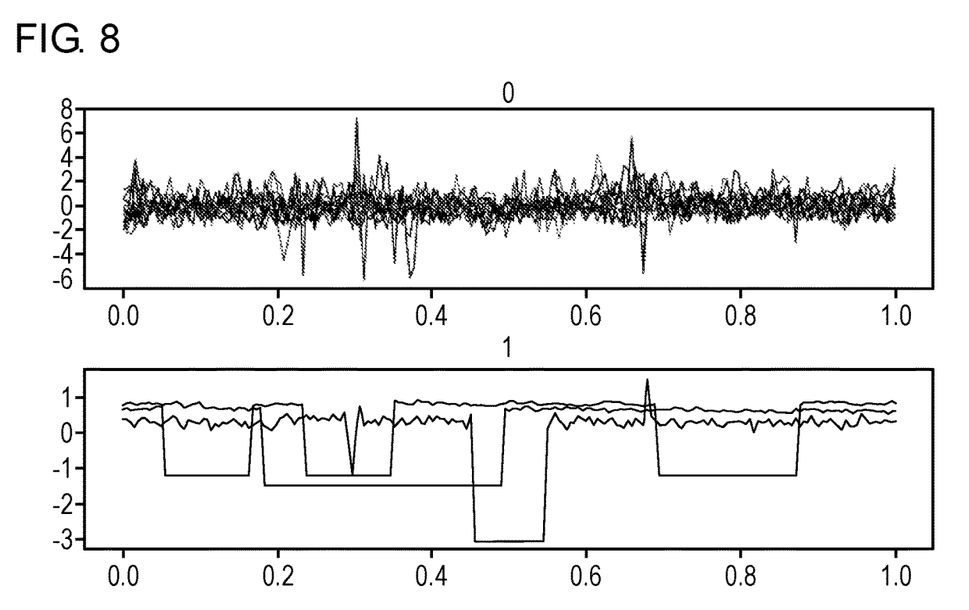
FIG. 8 illustrates a PhysioNet Gait in an exemplary dataset.

FIG. 8 shows both the uncorrupted and corrupted data. Three time series are corrupted, where corruption consists of zeroing out of sections of each series. The uncorrupted time series are shown in the top panel labeled 0, and the corrupted time series are shown in the bottom panel labeled 1. The method 100 can uncover the corrupted data, which would be modeled differently from the uncorrupted data.

Figure 9:
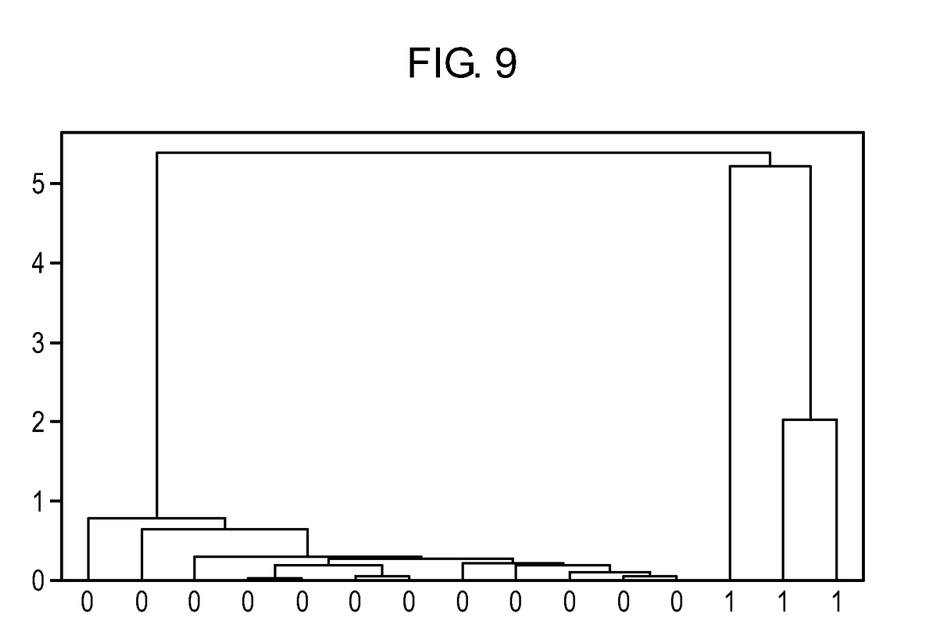
FIG. 9 shows a dendrogram visualizing an exemplary HAC clustering.
Figure 10:
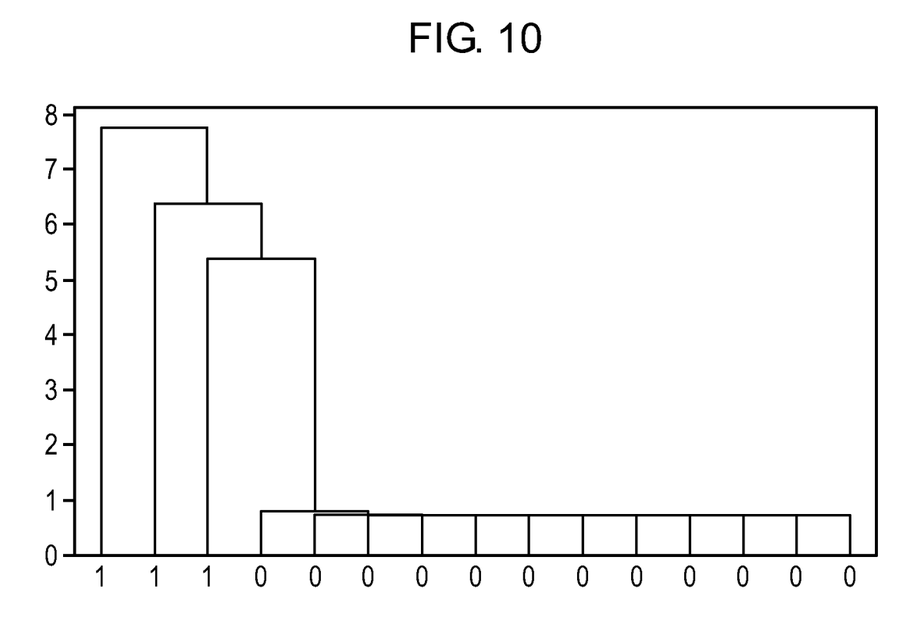
FIG. 10 shows a dendrogram visualizing an exemplary HAC clustering.

FIG. 9 illustrates the clustering, where leaf labels correspond to the grouping labels from FIG. 8. It can be seen in FIG. 9 that the use of method 100 for anomaly detection can lead to a clear separation of the corrupted data from the uncorrupted data. FIG. 10 shows the clustering found using SAX BoP, which clearly separates the corrupted data from the uncorrupted data.

Figure 11:
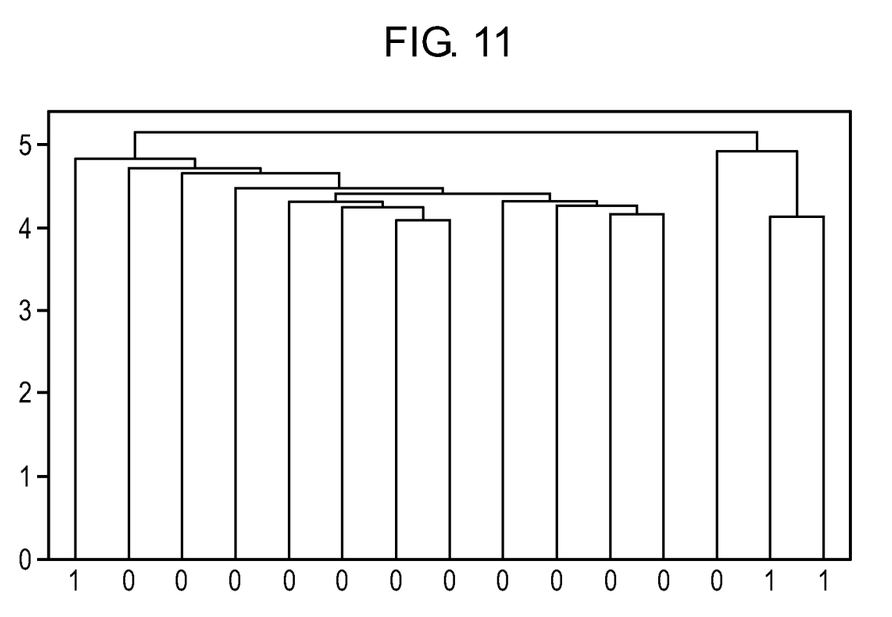
FIG. 11 shows a dendrogram visualizing an exemplary HAC clustering.

FIG. 11 shows the clustering found using DTW. As previously described, k-Shape is not amenable to a dendrogram representation and specifies that the number of clusters be determined and identified beforehand. When initialized with the number of clusters set to two, k-Shape does not recover the same groupings as shown in FIG. 8. Instead, k-Shape achieves a homogeneity score of 0.141, a completeness score of 0.122, and a V-measure score of 0.131.

Figure 12:
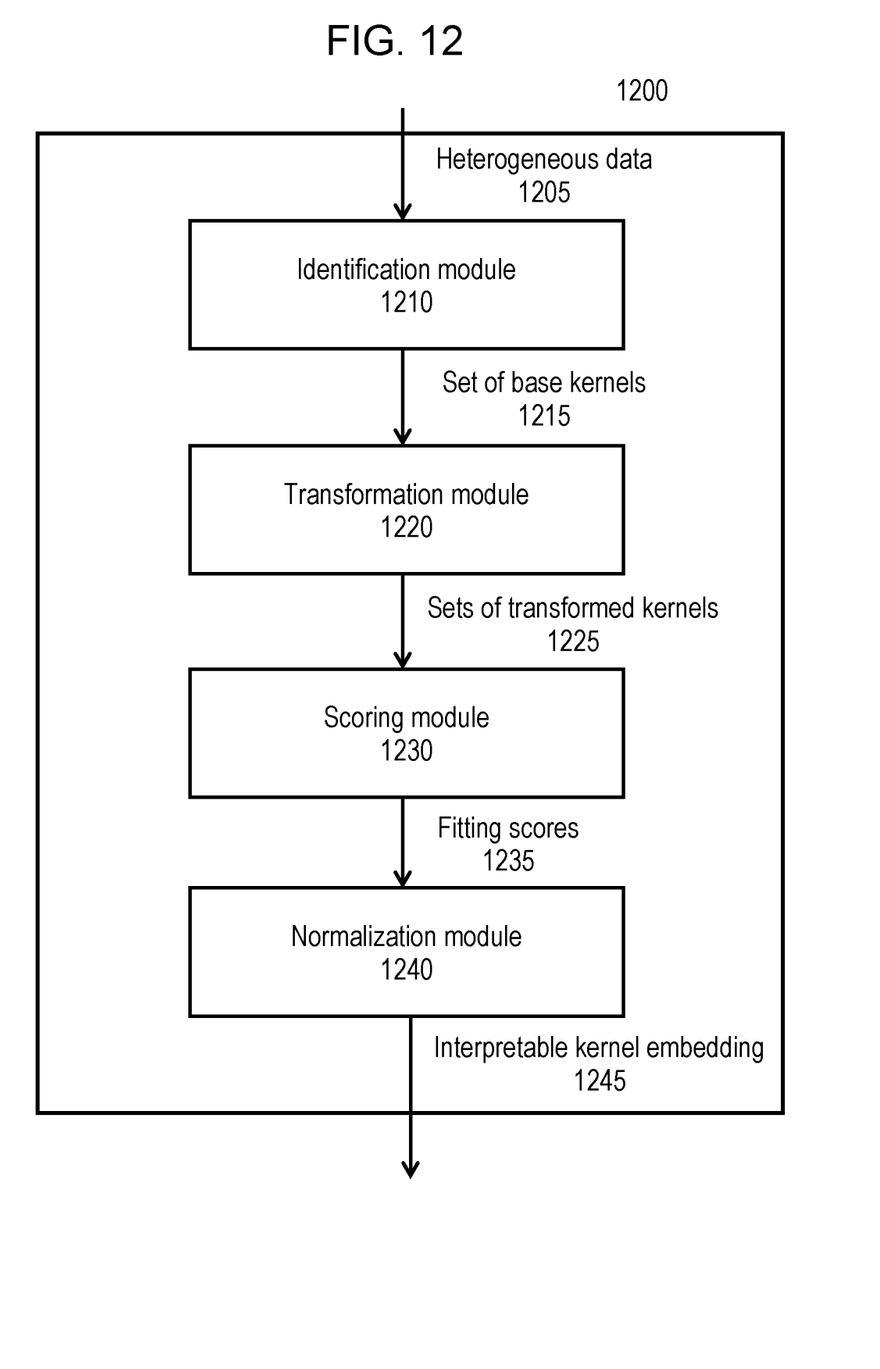
FIG. 12 illustrates an exemplary system for generating an interpretable kernel embedding for heterogeneous data.

FIG. 12 shows an exemplary system 1200 for generating an interpretable kernel embedding for heterogeneous data 1205. The system 1200 can include an identification module 1210 configured to identify a set of base kernels 1215 in heterogeneous data 1205. Aspects of the identification module 1210 relate to the previous discussion of the identifying step 110.

In an exemplary embodiment, the system 1200 can include a transformation module 1220 configured to create multiple sets of transformed kernels 1225 by an application of a unique composition rule or a unique combination of multiple composition rules to the set of base kernels 1215. Aspects of the transformation module 1220 relate to the previous discussion of the step 120.

In an exemplary embodiment, the system 1200 can include a scoring module 1230 configured to fit the multiple sets 1225 into a stochastic process model, and generate fitting scores 1235 that respectively indicate a degree of fitting for each of the multiple sets. Aspects of the scoring module 1230 relate to the previous discussion of the scoring step 130.

In an exemplary embodiment, the system 1200 can include a normalization module 1240 configured to save the fitting scores 1235 in a matrix, and standardize the matrix to generate an interpretable kernel embedding 1245 for heterogeneous data. Aspects of the scoring module 1240 relate to the previous discussion of steps 140 and 150.

A person having ordinary skill in the art would appreciate that embodiments of the disclosed subject matter can be practiced with various computer system configurations, including multi-core multiprocessor systems, minicomputers, mainframe computers, computers linked or clustered with distributed functions, as well as pervasive or miniature computers that can be embedded into virtually any device. For instance, one or more of the disclosed modules can be a hardware processor device with an associated memory.

A hardware processor device as discussed herein can be a single hardware processor, a plurality of hardware processors, or combinations thereof. Hardware processor devices can have one or more processor "cores." The term "non-transitory computer readable medium" as discussed herein is used to generally refer to tangible media such as a memory device.

Various embodiments of the present disclosure are described in terms of an exemplary computing device. After reading this description, it will become apparent to a person skilled in the relevant art how to implement the present disclosure using other computer systems and/or computer architectures. Although a set of operations can be described as a sequential process, some of the operations can in fact be performed in parallel, concurrently, and/or in a distributed environment, and with program code stored locally or remotely for access by single or multi-processor machines. In addition, in some embodiments the order of operations can be rearranged without departing from the spirit of the disclosed subject matter.

A system (e.g. system 1200), as used herein, can be in combination with one or more nodes, wherein the system resides in the one or more nodes. A node can be configured to interface or contain one or more components of the systems described herein.

A hardware processor, as used herein, can be a special purpose or a general purpose processor device. The hardware processor device can be connected to a communications infrastructure, such as a bus, message queue, network, multi-core message-passing scheme, etc. An exemplary computing device, as used herein, can also include a memory (e.g., random access memory, read-only memory, etc.), and can also include one or more additional memories. The memory and the one or more additional memories can be read from and/or written to in a well-known manner. In an embodiment, the memory and the one or more additional memories can be non-transitory computer readable recording media.

Data stored in the exemplary computing device (e.g., in the memory) can be stored on any type of suitable computer readable media, such as optical storage (e.g., a compact disc, digital versatile disc, Blu-ray disc, etc.), magnetic tape storage (e.g., a hard disk drive), or solid-state drive. An operating system can be stored in the memory.

In an exemplary embodiment, the data can be configured in any type of suitable database configuration, such as a relational database, a structured query language (SQL) database, a distributed database, an object database, etc. Suitable configurations and storage types will be apparent to persons having skill in the relevant art.

The exemplary computing device can also include a communications interface. The communications interface can be configured to allow software and data to be transferred between the computing device and external devices. Exemplary communications interfaces can include a modem, a network interface (e.g., an Ethernet card), a communications port, a PCMCIA slot and card, etc. Software and data transferred via the communications interface can be in the form of signals, which can be electronic, electromagnetic, optical, or other signals as will be apparent to persons having skill in the relevant art. The signals can travel via a communications path, which can be configured to carry the signals and can be implemented using wire, cable, fiber optics, a phone line, a cellular phone link, a radio frequency link, etc.

Memory semiconductors (e.g., DRAMs, etc.) can be means for providing software to the computing device. Computer programs (e.g., computer control logic) can be stored in the memory. Computer programs can also be received via the communications interface. Such computer programs, when executed, can enable the computing device to implement the present methods as discussed herein. In particular, the computer programs stored on a non-transitory computer-readable medium, when executed, can enable a hardware processor device to implement the exemplary methods, or similar methods, as discussed herein. Accordingly, such computer programs can represent controllers of the computing device.

Where the present disclosure is implemented using software, the software can be stored in a computer program product or non-transitory computer readable medium and loaded into the computing device using a removable storage drive or communications interface. In an exemplary embodiment, any computing device disclosed herein can also include a display interface that outputs display signals to a display unit, e.g., LCD screen, plasma screen, LED screen, DLP screen, CRT screen, etc.

It will be appreciated by those skilled in the art that the present disclosure can be embodied in other specific forms without departing from the spirit or essential characteristics thereof. The presently disclosed embodiments are therefore considered in all respects to be illustrative and not restrictive. The scope of the disclosure is indicated by the appended claims rather than the foregoing description, and all changes that come within the meaning, range, and equivalence thereof are intended to be embraced therein.

What is claimed is:

1. A computer-implemented method for generating an interpretable kernel embedding for heterogeneous data, the method comprising:
   obtaining, in a processing system, heterogeneous data including at least two or more subsets differing in linear or non-linear trends or behavior;
   identifying, in a processing device of the processing system, an initial set of kernels in the heterogeneous data;
   expanding, in the processing device of the processing system, the initial set of kernels by combining each kernel in the initial set with one or more other kernels in the initial set;
   fitting, in the processing device of the processing system, each kernel in the expanded set of kernels using a stochastic process model to generate a fitting score that grades a degree in which a respective kernel can model at least one common feature among two or more of the subsets of the heterogeneous data;
   storing, in a memory device of the processing system, the fitting scores in a matrix;
   standardizing, via the processing device of the processing system, the matrix to generate the interpretable kernel embedding for an embedding space for the heterogeneous data including at least the two or more subsets having the at least one common feature; and
   generating, via the processing device of the processing system, an output that identifies at least groupings of the heterogeneous data based on distances between the subsets in the interpretable kernel embedding.

2. The method of claim 1, wherein the stochastic process model is a Gaussian process model.

3. The method of claim 1, wherein the interpretable kernel embedding determines one or more groupings in the embedding space.

4. The method of claim 1, wherein the interpretable kernel embedding detects one or more patterns in the embedding space.

5. The method of claim 1, wherein the interpretable kernel embedding detects one or more anomalies in the embedding space.

6. The method of claim 1, wherein each row of the standardized matrix corresponds to a representation of a linear or non-linear trend or behavior in the embedding space, and each column is a dimension of the embedding space, each column being associated with a specific kernel.

7. The method of claim 6, wherein the linear or non-linear trend or behavior is a time series.

8. A system for generating an interpretable kernel embedding for heterogeneous data, the system comprising:
   an interface configured to obtain heterogeneous data including at least two or more subsets differing in linear or non-linear trends or behavior;
   a processing device configured to include:
      an identification module configured to identify an initial set of kernels in the heterogeneous data;
      a transformation module configured to expand the initial set of kernels by combining each kernel in the initial set with one or more other kernels in the initial set;
      a scoring module configured to fit each kernel in the expanded set of kernels using a stochastic process model, and generate a fitting score that grades a degree in which a respective kernel can model at least one common feature among two or more of the subsets of the heterogeneous data; and
      a normalization module configured to save the fitting scores in a matrix and standardize the matrix to generate an interpretable kernel embedding for an embedding space for the heterogeneous data including at least the two or more subsets having the at least one common feature,
   the interface configured to generate an output that identifies at least groupings of the heterogeneous data based on distances between the subsets in the interpretable kernel embedding.

9. The system of claim 8, wherein the stochastic process model is a Gaussian process model.

10. The system of claim 8, wherein the interpretable kernel embedding determines one or more groupings in the embedding space.

11. The system of claim 8, wherein the interpretable kernel embedding detects one or more patterns in the embedding space.

12. The system of claim 8, wherein the interpretable kernel embedding detects one or more anomalies in the embedding space.

13. The system of claim 8, wherein each row of the standardized matrix corresponds to a representation of a linear or non-linear trend or behavior in the embedding space, and each column is a dimension of the embedding space, each column being associated with a specific kernel.

14. The system of claim 13, wherein the linear or non-linear trend or behavior is a time series.

* * * * *